May 26, 1964      A. H. ROBSON      3,134,582
AIR HEATING METHOD AND APPARATUS
Filed Feb. 20, 1961
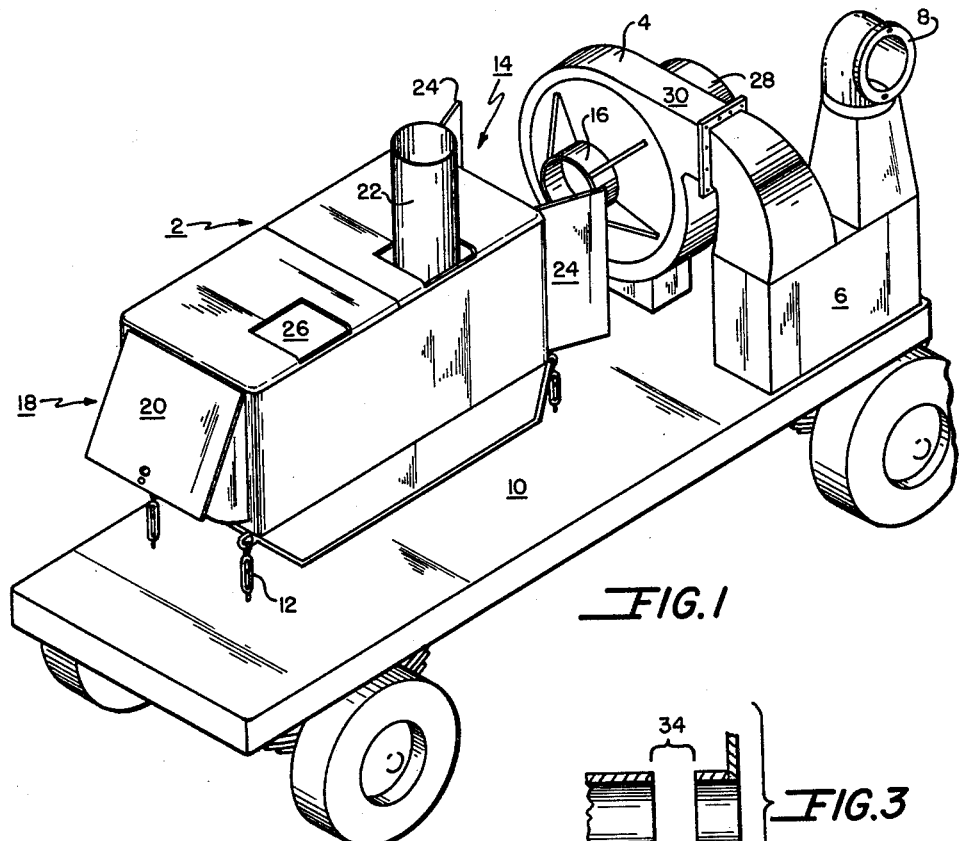
FIG. 1
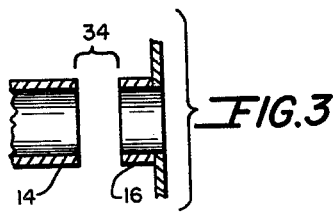
FIG. 3
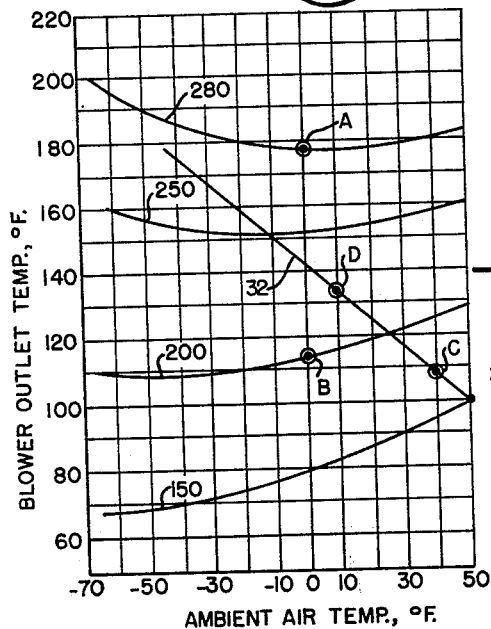
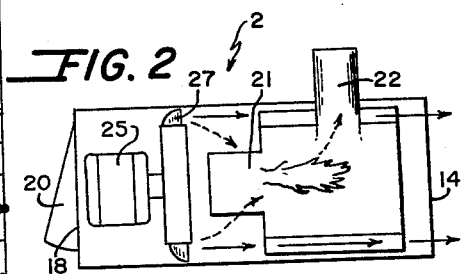
FIG. 2
FIG. 4
INVENTOR.
AUBREY H. ROBSON
BY Edward C. Airay
ATTORNEY

United States Patent Office 3,134,582
Patented May 26, 1964

3,134,582
AIR HEATING METHOD AND APPARATUS
Aubrey H. Robson, Rock Island, Ill., assignor to American Air Filter Company, Inc., Louisville, Ky., a corporation of Delaware
Filed Feb. 20, 1961, Ser. No. 90,309
5 Claims. (Cl. 263—19)

This invention relates to a method and apparatus for providing a source of heating and ventilating air for an aircraft while it is on the ground.

The passenger cabins of large commercial aircraft while on the ground may require unheated ventilating air during part of the time, and heated air of selected temperature at other times. While these requirements may seem, at first glance, to be relatively simple, the apparatus for meeting them is often relatively complex and includes expensive, complicated control apparatus, damper arrangements and the like.

An object of this invention is the provision of an aircraft heating-ventilating apparatus of relatively simple, inexpensive character, and which is comprised of commercially available components which can be used in accordance with the principles of the invention without material modification.

Another object is the provision of such apparatus arranged for operation in a novel manner which utilizes the temperature-volume relationship of air to effect a degree of control on the final temperature of air delivered from the apparatus.

The invention is premised on the recognition of several things. First, if a volume of ambient air is heated, the increase in volume of the heated air will be in proportion to the temperature rise of the air. For example, if 870 cubic feet of —65° F. ambient air is heated to 280° F., the volume of the heated air will be about 1630 cubic feet; while if 870 cubic feet of 0° F. ambient air is heated to 280° F., the volume of the heated air will be about 1400 cubic feet. Second, a fan or blower operating in a system of constant resistance at a constant speed is a constant volume device. Third, if heated air of one volume or another is introduced into a blower having a greater air volume capacity than the volume of heated air, and provision is made to permit the introduction of ambient air along with the heated air, the quantity of ambient makeup air introduced into the blower will vary inversely with the quantity of the heated air. The compensating change of makeup air admitted to the blower is utilized in the present invention to effect a degree of control on the blower outlet temperature.

In carrying out the invention, an air heater having a constant speed fan and means to control the outlet air temperature is used to provide a source of heat. An air blower unit having a selected air volume capacity somewhat in excess of the air volume delivered by the heater with the highest temperature rise encountered under normal operating conditions is also used. The heater is disposed with its outlet adjacent to, but spaced from, the blower inlet. The spacing is such that while the heated air is drawn into the blower inlet, whatever additional air is required to equal the volume of the blower may be readily drawn from the atmosphere.

With this arrangement, and assuming the heater is set to provide heated outlet air at a particular temperature, a rise in the temperature of the ambient air will result in a lesser temperature rise of the air passing through the heater. Consequently, the volume of heated air directed to the inlet of the blower decreases and the volume of unheated ambient air drawn directly into the blower correspondingly increases. By selecting a blower having a particular air volume rating relative to the air volume range and heating capacity of the heater, a blower outlet temperature having a particular temperature variation characteristic relative to ambient air temperature variations is obtainable. In certain cases it is preferable that the blower capacity be sufficiently high that at a maximum heater outlet temperature setting the blower outlet temperature will not exceed a predetermined temperature such as 200° F. Limiting the blower outlet temperature may be desirable to avoid the possibility of damaging the air conveying ducts on the blower outlet in case the heater controls are accidentally set for a maximum outlet temperature when the ambient air temperature does not indicate a need for such temperature.

The invention will be described in connection with the drawing which illustrates the principles of the invention incorporated in one embodiment by way of example, and wherein:

FIGURE 1 is an isometric view illustrating one manner in which the apparatus elements of the invention may be arranged;

FIGURE 2 is a graph showing blower outlet temperatures obtained at different ambient air temperatures when a blower having a selected capacity is utilized with a particular heater operated at several different outlet temperatures;

FIGURE 3 is a somewhat diagrammatic illustration in cross-section of a heater outlet and a blower inlet for purposes of describing minimum spacing limitations between the heater outlet and the blower inlet;

FIGURE 4 is a largely diagrammatic side view, in the nature of a vertical section, of an indirect-fired heater.

Referring to FIGURE 1, the air heater 2, centrifugal fan or blower 4, air aftercleaner or filter assembly 6, and outlet duct connection 8 are mounted upon a trailer bed 10 so that the apparatus may be moved about an air field. The air heater 2 must be an indirect fired type and suitably may be of the general type disclosed in Hubbard U.S. Patents 2,744,516 and 2,758,591, and commercially available in substantially the form illustrated. It is securely fixed to the trailer bed 10 by turn-buckles 12 with its air discharge end 14 opposite the centrifugal blower air inlet 16.

The air inlet end 18 of the heater shown has a weather shielding door 20 operable to the illustrated position to admit ambient air. Part of the admitted air is heated and discharged out of the opposite end 14 of the heater, the flow path of this air being indicated by the solid line arrows in FIGURE 4; and part is forced into the combustor 21 and then discharged out of the stack 22 as indicated by the broken line arrows of FIGURE 4. The discharge end 14 of the air heater shown has a pair of doors 24 which may be opened to the illustrated position to permit the discharge of the heated air from the air heater outlet directly toward the air inlet 16 of the blower 4. The adjustable elements for setting the temperature controls of the heater are within the heater cabinet, and are accessible through door 26 in the top wall of the cabinet. Preferably the air heater is arranged so that an electric motor 25 drives the air heater elements such as ventilating and combustion air fans 27, fuel pump and accessory drive.

The blower 4 is also fixed to the trailer bed 10 by suitable means. It is driven by an electric motor 28 connected to receive electrical power from the same mobile source as the heater motor. The blower outlet 30 is connected to pass air into the air filter assembly 6 where it is cleaned. The cleaned air then passes out the duct connector 8 into a delivery duct (not shown) which leads to the air distribution system of the aircraft.

When an aircraft is to be served with heated air while on the ground, the conveying duct extending between the aircraft and the connector 8 is attached, the air heater controls are set to control the temperature of the air discharged from the end 14 of the heater at a particular temperature level in accordance with whatever the ambient air temperature is, and the heater is fired. The blower 16 is then placed in operation so all of the uncontaminated heated air discharged from the heater is drawn into the blower inlet 16. This heated air, plus whatever unheated ambient air is drawn into the blower as makeup air to equal the blower air capacity, is forced through the filter assembly 6 and duct to the aircraft. If the ambient air temperature is such that heated air is not required for the aircraft, only the blower is operated. It is noted that in the selection of the blower, the system characteristics (i.e., the relation between blower c.f.m., and resistance of the system elements such as filter, ducts and aircraft air distribution system), is taken into consideration so that adequate air flow to the aircraft is obtained.

Attention will now be given to specific temperatures available when the apparatus is operated under varying ambient temperature conditions.

The graph of FIGURE 2 illustrates the relationship between blower outlet temperature and ambient air temperature for a heater having a 870 c.f.m. fan operating in conjunction with a 1900 c.f.m. blower, and with the heater set to control the heater outlet air temperature at various levels. For a blower of less air capacity than 1900 c.f.m., the blower outlet temperature for any particular heater setting would be correspondingly greater throughout the ambient air temperature range. Conversely, for a blower of more air capacity than 1900 c.f.m., the blower outlet temperature for any particular heater setting would be correspondingly less throughout the ambient air temperature range. The 870 c.f.m. fan rating is used as an example because this is the fan rating of one commercially available heater embodying the inventions of the noted Hubbard patents.

The exemplary selection of a 1900 c.f.m. blower for operation with the heater which has a 870 c.f.m. fan and also has means for controlling the heater outlet temperatures within a range of about 150° to 280° F., is based in part upon preventing the blower outlet temperature from exceeding 200° F. throughout the ambient air range when the heater is set for a maximum outlet temperature of 280°. The 200° F. maximum temperature is considered to be one which would eliminate any possibility of heat damage to the air conveying duct in case the heater controls are incorrectly set too high relative to the existing ambient air temperature.

The curves designated 150, 200, 250 and 280 indicate the temperature of the air leaving the blower at various ambient air temperatures when the heater is controlled to give air outlet temperatures of 150° F., 200° F., 250° F., and 280° F., respectively. For example, point A on the 280 curve indicates that if the ambient air temperature is 0° F. and the heater is controlled to give an outlet temperature of 280° F., the blower outlet temperature will be about 178° F. As a further example, point B indicates that if the heater is set for a 200° F. outlet temperature, at 0° F. ambient, the blower outlet temperature will be about 113° F.

The diagonal straight line curve 32 of FIGURE 2 is an example of how the heater temperature selection control may be calibrated in terms of ambient temperature. Thus, depending upon the heat loss characteristics of a particular aircraft, the temperature selection control may be calibrated in a manner so that the control is set at a particular point to give a heater outlet temperature of about 165° (point C) when the ambient temperature is 40° F. This in turn gives a blower outlet temperature of about 108° F. with the 1900 c.f.m. blower. If the ambient air temperature is, say 10° F., the temperature selection control may be set to give a heater outlet temperature of about 220° (point D), which in turn gives a blower outlet temperature of about 134° F. with the 1900 c.f.m. blower. It will be appreciated that the straight line curve 32 is simply an example of a possible calibration. Thus, in accordance with the heat loss characteristics of an aircraft, the diagonal line 32 could be curved, shifted to the right or left, or have a different slope within the range defined at the top and bottom by the 280 and 150 curves, respectively.

FIGURE 3 diagrammatically illustrates a heater discharge end 14 and a blower inlet 16 spaced apart by a distance 34. The distance 34 should be sufficiently great that the velocity pressure of makeup air being aspirated through the open annular area does not cause a suction effect which would adversely affect heater performance by robbing combustion air. The minimum spacing may be determined by calculating the makeup air velocity at a particular ambient temperature and with the maximum allowable velocity pressure. Since the volume rate at which makeup air is drawn into the blower inlet is known by calculation, the minimum annular area may then be calculated. Then since the diameters of the heater outlet and blower inlet are also known, the minimum spacing may readily be determined. As an example, if the limiting suction of a particular heater is 0.375″ W.G. and the heater outlet and blower inlet are circular and have a 12″ diameter, the minimum spacing 34 would be about 1½″. Since as a practical matter such a close spacing is not necessary, it will be appreciated that the suction effect poses no particular problem. The maximum spacing distance should not exceed a value above which some of the heated air from the heater would escape the blower inlet.

Since some of the advantages of the invention may not be readily appreciated, the following is noted. The control of the blower outlet temperature may be effected without requiring a temperature sensing element in the blower outlet. Consequently, a commercially available "packaged" heater may be used without modification. The use of a complicated damper system for controlling proportions of heated air and ambient air is avoided, along with the concomitant variations in the system characteristic or resistance as the positions of the dampers are changed. When unheated ambient air only is used for ventilation, the air need not be drawn through the heater structure. The heater may be readily disassociated from the apparatus for storage or service during a cooling season without disturbing ramp service. Further the heater may be used alone to deliver high temperature de-icing air or air for warming a cold soaked aircraft engine without modification of the heater or its control system.

The invention claimed is:

1. In the method of providing heated air of a desired temperature: positioning an indirect-fired forced air heater with its uncontaminated heated air outlet adjacent to, but spaced from, the inlet of a blower; operating said heater to induce ambient air thereinto at a substantially constant volume rate and to heat said air to a selected temperature determined in accordance with the temperature of said ambient air in an unheated condition; directing the heated air from said heater toward said blower inlet, the volume rate at which said heated air is discharged from said heater increasing in accordance with the temperature rise which said ambient air undergoes in passing through said heater; and operating said blower at a substantially constant air volume rate in excess of the volume rate at which said heated air is discharged from said heater so that unheated ambient air is drawn into said blower inlet through the space between said heater outlet and blower inlet.

2. In the method of providing heated air of a desired final temperature: inducing the flow of ambient air into an air heater at a substantially constant volume rate; heating said air in said heater to a selected temperature determined in accordance with the temperature of unheated ambient air, said heating causing said air to increase in volume in accordance with the temperature rise to which said air is subjected in the heating step; directing said increased volume of air from said heater toward the inlet of a blower adjacent to, but spaced from, the heater outlet; operating said blower at a rate causing the flow therethrough of a substantially constant air volume in excess of the maximum air volume emerging from said heater outlet so that all of said heated air is drawn into said blower along with additional unheated ambient air sufficient to equal said blower air volume capacity.

3. The method of supplying heated ventilating air at a temperature level not exceeding a selected temperature to a space to be conditioned, comprising: heating a substantially constant volume of ambient air to a temperature determined in accordance with the existing ambient air temperature, said heating step causing an increase in volume of said heated ambient air in accordance with the air temperature rise due to said heating; directing said heated air through a space open to unheated ambient air and into a constant volume blower having a capacity exceeding, by a predetermined amount, the maximum air volume of said heated air under conditions of maximum temperature rise, whereby unheated ambient air is induced along with said heated air into said blower, the volume of said unheated air induced into said blower being substantially equal to the difference between the air volume capacity of said blower and the air volume of said heated air; mixing said heated and unheated air in said blower to obtain said heated ventilating air; and directing said heated ventilating air to said space.

4. Apparatus for providing heated air of a desired final temperature, comprising: an indirect fired, forced air heater having fan means operable at a substantially constant rate for inducing the flow of a substantially constant air volume into said heater, and having fuel firing rate control means operable to provide a selected air outlet temperature; air blower means including a motor for operating said blower means at a rate giving a blower air volume greater than the air volume emerging from said heater outlet; and means for mounting said heater and said blower with the outlet of said heater directed toward the inlet of said blower, said outlet and inlet being so spaced that makeup ambient air is readily admitted to said blower inlet and substantially all of said heated air emerging from said heater outlet is induced into said blower inlet.

5. Apparatus for heating and ventilating a space to be conditioned with forced air within a temperature range not exceeding a selected temperature irrespective of normally encountered ambient temperature variations requiring heating of the space, comprising: a forced air heater having an ambient air inlet, heated air outlet and a first air blower of predetermined air volume capacity for causing the flow of air therethrough; a second, separate air blower having an air inlet and outlet, said second air blower having a selected air volume capacity in excess of the air volume emerging from said heated air outlet with a maximum temperature rise of the air passed through said heater; means for controlling the heating rate of said heater to obtain a selected temperature of the air emerging from said heater irrespective of the ambient air temperature; means supporting and positioning said heater and said second blower with said heated air outlet in proximate, spaced, relation to said second blower inlet for causing the heated air from said heater outlet to be induced into said inlet along with additional unheated ambient air adequate to total the air flow capacity of said second blower.

References Cited in the file of this patent

UNITED STATES PATENTS

| | | |
|---|---|---|
| 2,579,158 | Scheu | Dec. 18, 1951 |
| 2,744,516 | Hubbard | May 8, 1956 |
| 2,758,590 | Besser | Aug. 14, 1956 |
| 2,758,591 | Hubbard | Aug. 14, 1956 |